(12) United States Patent
BeSerra et al.

(10) Patent No.: US 10,489,232 B1
(45) Date of Patent: Nov. 26, 2019

(54) DATA CENTER DIAGNOSTIC INFORMATION

(71) Applicant: Amazon Technologies, Inc., Seattle, WA (US)

(72) Inventors: Christopher James BeSerra, Federal Way, WA (US); Gavin Akira Ebisuzaki, Bellevue, WA (US); Terry Lee Nissley, Lacey, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/869,415

(22) Filed: Sep. 29, 2015

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0787* (2013.01)

(58) Field of Classification Search
CPC ..................................................... G06F 11/079
See application file for complete search history.

(56) References Cited

U.S. PATENT DOCUMENTS

| | | | | |
|---|---|---|---|---|
| 7,428,300 B1* | 9/2008 | Drew | ............. | H04M 3/2254 379/14.01 |
| 7,774,651 B2* | 8/2010 | Mukherjee | .......... | G06F 11/0724 714/26 |
| 8,122,290 B2* | 2/2012 | Walton | ............... | G06F 11/0712 714/26 |
| 8,832,501 B2* | 9/2014 | Tanaka | ............... | G06F 11/0784 714/31 |
| 8,924,533 B2* | 12/2014 | Adams, Jr. | ........... | H04Q 3/0075 709/223 |
| 9,104,565 B2* | 8/2015 | Son | ...................... | G06F 11/0748 |
| 9,343,181 B2* | 5/2016 | Suhas | ................. | G06F 12/0646 |
| 2008/0120282 A1* | 5/2008 | Liberty | ............... | G06F 17/3089 |
| 2009/0265142 A1* | 10/2009 | Liu | ........................ | H04L 41/00 702/190 |
| 2016/0261455 A1* | 9/2016 | Su | ........................ | H04L 41/069 |

OTHER PUBLICATIONS

Microsoft Computer Dictionary, Microsoft Press, 4th Ed. page 28 1999.*
"Remote Management Module 4 and Integrated BMC Web Console User Guide"; Intel; Order No. H54847-001; Revision 2.8; Jul. 2014; 136 pages.

* cited by examiner

*Primary Examiner* — Christopher S McCarthy
(74) *Attorney, Agent, or Firm* — BakerHostetler

(57) ABSTRACT

In a provider network, a request is received for diagnostic information for a computing resource. In response to the request, diagnostic information from the computing resource is accessed via an out-of-band communication channel. The diagnostic information is stored for fault analysis. The out-of-band communication channel is operative when the one computing resource is not in a normal operating state.

20 Claims, 7 Drawing Sheets

DATA CENTER DIAGNOSTIC INFORMATION

BACKGROUND

A data center is a facility that houses computer systems and various networking, storage and other related components. Data centers may, for example, provide computing services to businesses and individuals as a remote computing service or to provide "software as a service" (e.g., cloud computing). When a failure of a computing component occurs, customers may lose data and may be unable to provide services to their downstream customers, resulting in lost revenue and customer dissatisfaction.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

Figure 1:
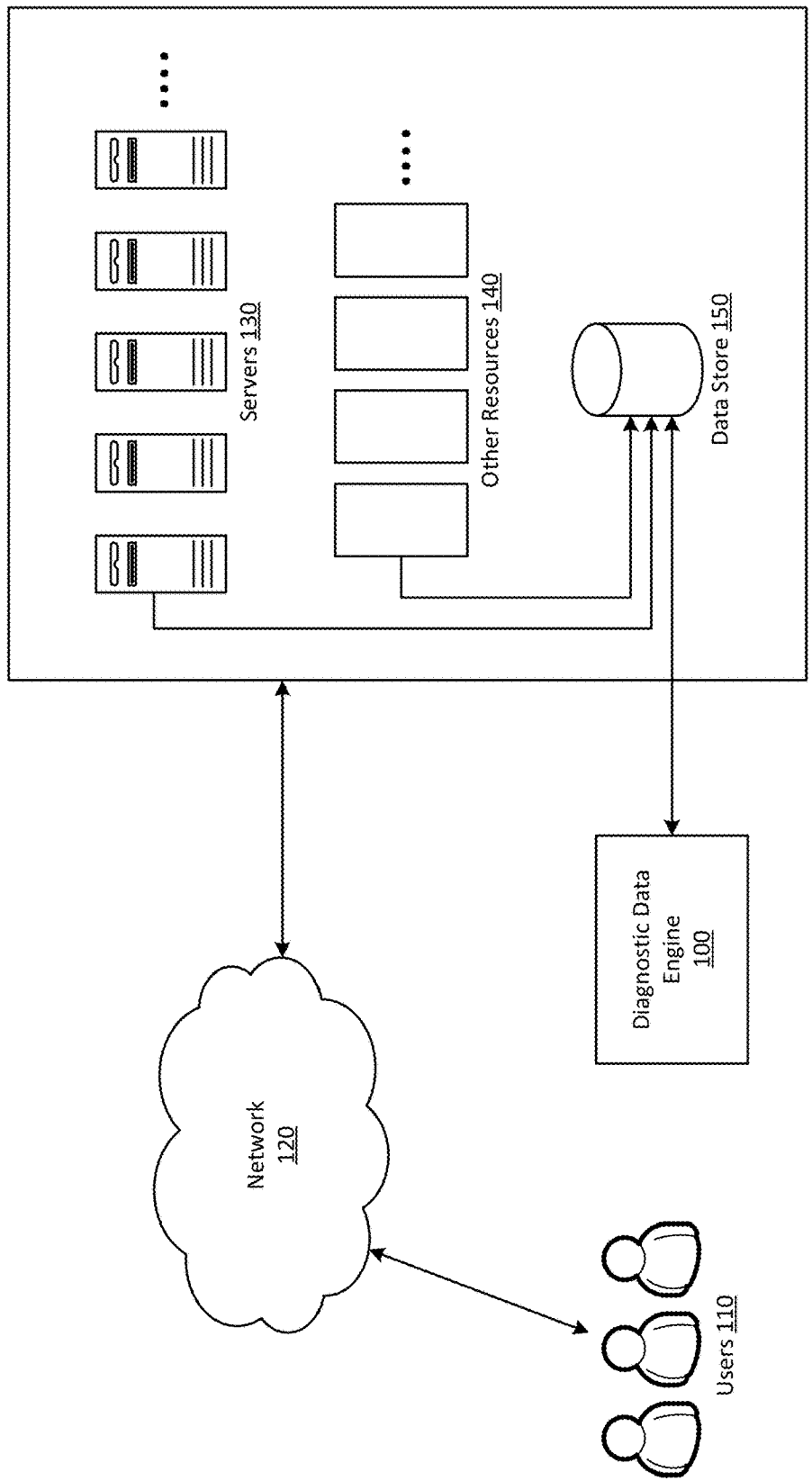
FIG. 1 is a diagram illustrating a mechanism for managing operability of a provider network in accordance with the present disclosure.

A data center may house many thousands of components such as servers and storage devices. When a device fails, troubleshooting the problem can be a difficult process due to the lack of diagnostic information that may be needed to troubleshoot a particular failure issue. Computing environments in a data center can include a vast number of interconnected devices. Technologies such as virtualization can increase this complexity. The computing environments may include a mix of various types of data flowing through both virtual and physical components. Computing devices such as servers and routers may have complex interactions, and behaviors in one area can affect the performance of the entire computing environment.

While data of various kinds such as log files, work flow data, metrics, customer traffic analysis and usage logs, and configurations of load balancers may be available, the specific data needed to analyze a specific issue such as a system crash is often only available by removing the failed equipment and configuring the equipment with specialized test and analysis and diagnostic equipment and software that implement debugging interfaces such as the Joint Test Action Group (JTAG) interface. In the case of a data center with thousands of servers and other devices, it can be infeasible and cost-prohibitive to provide this level of interaction with the equipment. While performance parameters that indicate how resources in the data center's computing environment is performing may be collected, such as operating temperature, fan speed, and voltages, such information does not provide the level of detail that is needed to perform detailed fault analysis.

Even when the cause of a problem is found, the loss of the device may result in lost data, down time, and customer dissatisfaction. It would be useful to have access to specific diagnostic information to more efficiently troubleshoot failure of a device, or to be able to monitor specific information and prevent a failure before it actually occurs. Failure prevention can allow the service provider to take preemptive measures such as bringing another device on-line and thus avoid problems associated with an unexpected loss of a device.

In various embodiments, this disclosure describes methods and systems for scalably accessing and collecting diagnostic information for a plurality of devices in a data center. The diagnostic information may be accessed and collected on an on-demand basis or in response to specific selectable events. The diagnostic information may include hardware-specific diagnostic data. The diagnostic information may be accessed and collected from devices across an entire data center or multiple data centers. The diagnostic information may be used for analysis of a specific fault or failure, and can also be stored and analyzed for failure trend analysis, system baselining, and other analysis and recordkeeping.

In some embodiments, one or more selectable fault events may cause the initiation of a process to access and store diagnostic information for a device that experiences such a failure event. Additionally, such a process may be initiated in response to a specific command or selection by a user. In one embodiment, the selection of a button on a device may cause initiation of the process. Such a button may be a non-maskable interrupt (NMI) button on a chassis of a computing device. Additionally, an NMI event may also be generated remotely via a user interface at another location by data center personnel. For example, data center maintenance personnel may select a debug button on a control panel or other user interface to trigger a data collection event. In some embodiments, the device may be configured to be capable of running without system BIOS functioning, in the event of a failure that prevents entry of the system management mode (SMM).

The selectable fault event may be any event that is selected to be a trigger event that causes the initiation of a diagnostic information collection process. Generally, such a fault event may be an uncorrectable error that requires further analysis prior to continued operation of the device.

In some embodiments, the Intelligent Platform Management Interface (IPMI) protocol may be used for sending and receiving information. For example, an OEM-specific IPMI command may be sent to the baseboard management controller (BMC) of a computing resource to launch the data collection routine. In other embodiments, other interfaces managing and monitoring computing devices in a manner that is independent of the device's CPU, firmware, and/or operating system may be used.

The types of diagnostic information that is collected may include, for example, Peripheral Component Interconnect (PCI) configuration space information, status registers, information from the baseboard management controller (BMC) such as temperature, cooling fan speed, and power status. Other types of information may include register information from chipsets on the computing device.

In one embodiment, a system that manages operability of a data center may be configured to receive a request for diagnostic information for one of a plurality of computing resources of the data center. The request may be generated in response to a user control, or the request may be generated in response to an indication of a fault event at the computing resource. In response to receiving the request, the system may access previously transmitted diagnostic information for the computing resource. For example, computing resources may periodically send diagnostic information for collection and storage, which can be accessed at a later time. The diagnostic information may be useful for troubleshooting future faults, or for analysis, trending, and predictive analysis.

The system may further access diagnostic information from the computing resource via an out-of-band communication channel. The out-of-band communication channel may include an interface that is operative even when the computing resource is not in a normal operating state. The previously transmitted diagnostic information and the accessed diagnostic information may be stored for fault analysis.

The request for diagnostic information can be submitted for a single resource or for multiple resources. For example, the request may cover all servers in a region or zone. Furthermore, since the request can be on-demand, the diagnostic information can be requested for specific time frames, thus allowing for greater control over the data collection times as compared to a push-type system where the resources may self-report diagnostic information. By providing an on-demand mechanism for obtaining diagnostic information, the administrators of a data center may be able to handle diagnostic information management on a larger scale and as the data becomes desired for analysis.

By obtaining diagnostic information on an on-demand basis via an out-of-band communication channel that is operative after a fault condition occurs, the maintenance personnel can obtain relevant information for troubleshooting even if the CPU becomes inoperative. For example, if a device becomes inoperative, a technician can locate the failed device and press an NMI button on the chassis of the failed device, triggering the accessing and transmitting of diagnostic information via the out-of-band communication channel.

The transmitted diagnostic information may be received and stored in a data store for later retrieval by maintenance personnel or by a maintenance analysis system. In some embodiments, diagnostic information that is periodically received for resources that have not yet failed may be analyzed to determine signature characteristics that indicate a likelihood of a future failure.

The diagnostic information collection process may be part of a system-wide data collection process to capture information for diagnosing system faults such as system crashes, system hangs, and other failures. In one embodiment, data for multiple failures and events can be collected and stored. The data can be stored in local non-volatile storage which can be accessed remotely by authorized systems in the data center.

While the present disclosure describes examples in terms of failures of data center equipment such as servers, it should be understood that the disclosed principles may be applied to other types of facilities and devices. For example, an event can be any type of system impairment such as loss of network connectivity or failure to respond within a specified time limit.

FIG. 1 is a diagram illustrating a system for managing operability of a provider network in accordance with the present disclosure. In FIG. 1, a data center may include resources and applications that may execute, for example, on one or more servers 130. It will be appreciated that some embodiments may involve additional resources of various types 140 that may be provided.

FIG. 1 also illustrates a communications network 120 that may include one or more computers accessible by users 110. According to one embodiment, resources executing on servers 130 may be configured to provide computing services to users 110 via network 120. For example, a resource may provide a set of remote access enterprise applications to a group of users who may, for example, be employees of an enterprise customer. FIG. 1 also illustrates a data store 150 that may store data pertaining to various parameters and metrics for servers 130 and resources 140.

A request may be sent to a diagnostic data engine 100 for requesting, monitoring, accessing, receiving, storing, and analyzing diagnostics data pertaining to one or more of the servers 130 or resources 140. In some embodiments, the diagnostic data engine 100 comprises a processor executing software instructions (e.g., on a computer local to or remote from the servers 130 and/or the resources 140). Alternatively, the diagnostic data engine 100 may be implemented entirely in hardware components, such as one or more integrated circuits. In some embodiments, a request may be received from one or more services at the service provider. In response to receipt of the request, diagnostic data engine 100 may log the request and provide updates as to the status of the request. The diagnostic data engine 100 may communicate with other services to facilitate: (1) processing of the request, (2) collection of data pertaining to request, and (3) generating interfaces to provide results of the request. The diagnostic data engine 100 may, for example, provide a user interface for facilitating submission of the request. The diagnostic data engine 100 may further provide a user interface for viewing the results of the request, modifying the request, or cancelling the request.

Diagnostic data engine 100 may be configured to provide analysis and diagnostics for faults based on real-time or accumulated and/or archived monitoring of various devices such as servers 130 or resources 140. The diagnostic data engine 100 may access diagnostics data and metrics such as PCI configuration space data. The diagnostic data engine 100 may be made accessible to a user or to an external service via an application programming interface (API) or a user interface that may be accessed via a Web browser or other input mechanisms.

Trouble-shooting a device failure may be difficult for the following reasons:

(1) Performing the trouble-shooting may require collection of parameters that are not typically monitored and collected.

(2) Performing the trouble-shooting is typically based on partial information. Information is usually incomplete due to the desired information being unavailable without a tool that is used in trouble-shooting (e.g., the information is located outside of the system that performs the troubleshooting).

(3) Performing the trouble-shooting may require experience to know what missing information needs to be collected. Gathering every piece of missing information may be time-consuming, expensive, and may also ultimately be unnecessary for the trouble-shooting process.

One way to address the above issues is to implement ways to collect the information via the described out-of-band interface on both an on-demand basis as well as triggered by specific events such as faults and events that may be indicative of an impending fault. For example, predictive analysis methods may be used to calculate the probability of a fault event based on historical analysis of equipment parameters and their correlation to known fault events.

In one embodiment, probabilities may be calculated for fault events based on various equipment parameters, and when a probability of a fault reaches a predetermined threshold value, a maintenance event may be initiated. Furthermore, the probabilities may be updated at specified time intervals, and the predictions may be further updated by comparing the predictions to actual observed fault behavior.

In some embodiments, an expert system that utilizes logical inferences based on the available information may be used. An expert system may take available information pertaining to actual failures of devices and use the information as input to a rules-based system to generate updated fault event probabilities. The available information may be provided to a Bayesian process to determine an updated probability for the event.

Within this operating environment, diagnostic data engine 100 may manage the collection and analysis of diagnostic information in response to requests, events, and predetermined diagnostic information collection epochs, and also determine predicted events such as a predicted failure of a server. Diagnostic data engine 100 may gather data from other components of the operating environment such as data store 150. Data store 150 may collect information from servers 130 and other resources 140, among others. The diagnostic data engine 100 may also collect information stored in log files and other locations. The information may also be obtained by querying devices for data that is not currently being stored in a log file.

In some cases, diagnostic data engine 100 may not have access to all available data for the relevant devices because obtaining all of this data would take too much time, would require too much storage space, or because some of the data has been determined to have a low likelihood of being relevant to the device of interest. In other cases, some of the data may be configured to be accessible only manually or may be unavailable because it is on a network segment to which the diagnostic data engine 100 does not have access. The diagnostic data engine 100 may use the available information for an initial analysis and update the analysis as more information becomes available.

After a diagnostic information collection event in response to a request such as a non-maskable interrupt (NMI), a notification that the information has been collected may be provided to the user who requested the diagnostic information. Additionally, further notifications may be provided if and when new information pertaining to the equipment becomes available. In some embodiments, information regarding correlations to past failures, if available, may also be provided. This may also comprise identifying a remedy to the potential source of the failure.

In some embodiments, the probability analysis may be performed based on machine learning via a machine learning system that includes one or more learning functions that learns the probabilities associated with the availability of various data that may be relevant to determination of failure causes.

In some embodiments, the diagnostic data engine 100 may monitor events and device parameters automatically. For example, the service provider may monitor a number of pre-selected events collected or determined at a predetermined frequency. Additional event data may be collected at the same or different frequencies as specified by the service provider. It should be understood that the event data may be collected for any of the computing resources provided by the service provider including servers, databases, storage, and the like.

Additionally, the diagnostic data engine 100 may provide users with the ability to request and receive notifications or to take specified actions depending on the events. For example, the service provider may migrate data from a server that is predicted to fail and shut down the server. In some embodiments, the event data may be retained for a predetermined time to allow maintenance personnel to retrieve historical metric data for review and analysis. A user interface may be provided to allow access to the diagnostic data engine 100.

In some embodiments, a time frame for the collection of diagnostic information may be specified as well as the equipment to be monitored. For example, maintenance personnel may want to collect diagnostic information for a bank of servers on an hourly basis over a period of one month.

The diagnostic data engine 100 may provide a detailed analysis and summary of collected diagnostic information to the requesting user. In some embodiments, the identification of one or more likely causes of a fault event may be accompanied by suggested solutions to the identified issues. For example, a summary of recommended actions to be taken by the service provider may be provided.

In some embodiments, an application programming interface (API) may be provided to facilitate requests for diagnostic information. For example, an API can be called with information such as a device identifier, event type, and time frame that pertains to the diagnostic information. After the API is called, in one embodiment the diagnostic data engine 100 may take actions such as:

Access diagnostic information logs for the device,
Retrieve PCI configuration data for the device,
Call additional APIs that can provide additional diagnostic information for the device,
Invoke a diagnostic information analysis function.

Using the gathered information, the diagnostic data engine 100 may store the diagnostic information, analyze the diagnostic information, combine or aggregate the data or extract portions of the diagnostic information as appropriate, and invoke the diagnostic information analysis function. The results of the data collection and analysis may be reported through the API along with details regarding where the information is stored, or if the requesting user would like to initiate a download of the collected diagnostic information and related analysis. When a user is initiating a request for diagnostic information collection, the API may return metadata about the device associated with the request. A request identifier may be generated to track and process the request.

Figure 2:
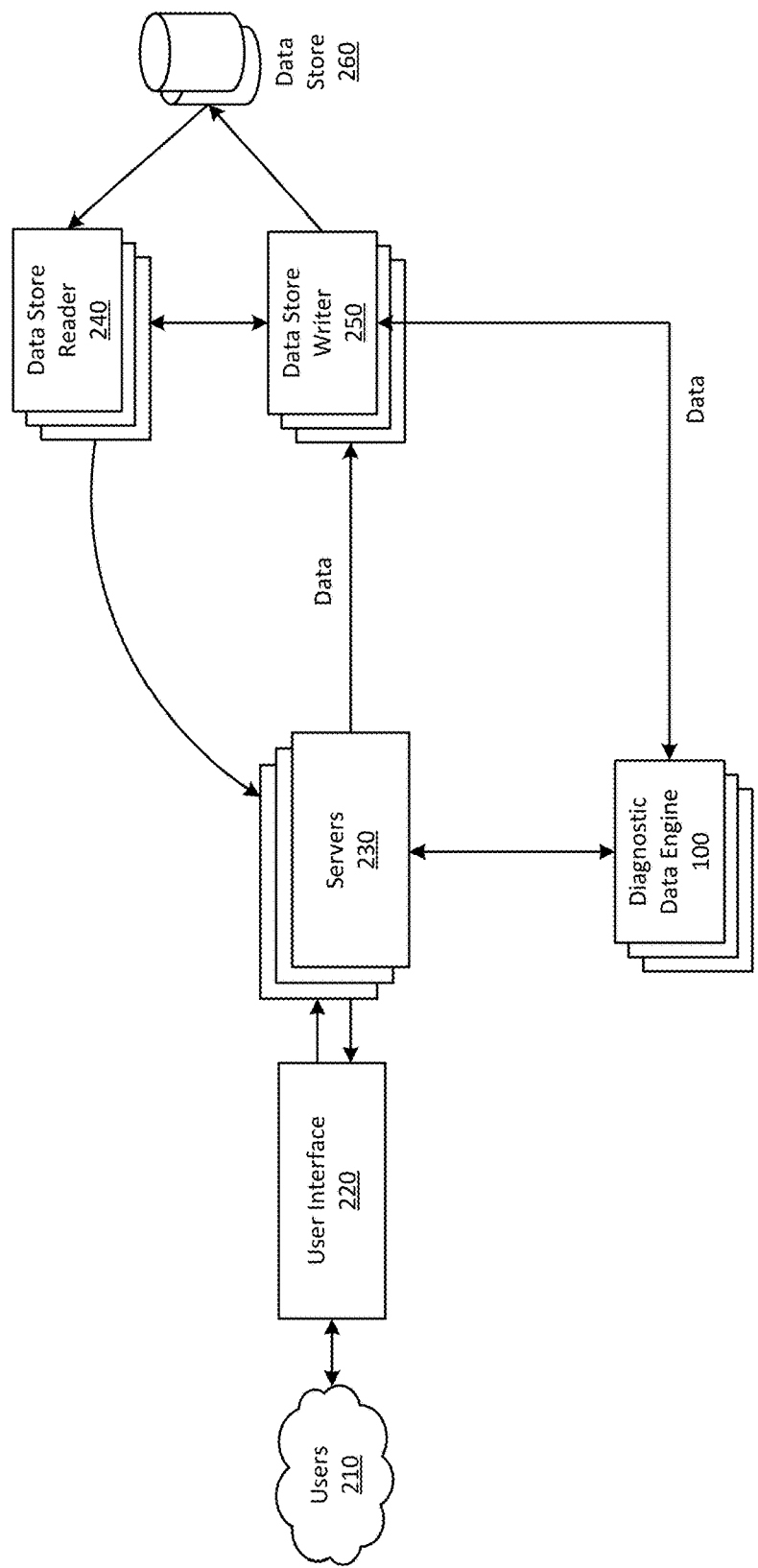
FIG. 2 is a diagram illustrating an example system for managing operability of a provider network in accordance with the present disclosure.

Referring to FIG. 2, illustrated is an example implementation of functionality associated with the diagnostic data engine 100. The diagnostic data engine 100 may access, or cause to be accessed, various data such as metrics and diagnostic information. The diagnostic data engine 100 may also generate or cause generation of data. Users 210 of the service provider may access a user interface 220 for requesting diagnostic information. In some embodiments, the user interface 220 can be generated by functions implemented in software executing on one or more servers 230. The requested metric data may be provided to a data store writer 250 that may store the diagnostic information. A data store reader 240 may be configured to access the data store 260 and retrieve diagnostic information based on requests from the users 210 or for other purposes. The diagnostic data engine 100 may manage the various diagnostic information that is to be collected. For example, the diagnostic data engine 100 may take actions such as invoke a service to generate a set of available metrics pertaining to the request and the associated device. The diagnostic data engine 100 may also access activity logs for the device, health status for the device, connection states for the device, configurations for the device, and hardware attributes (e.g., server manufacturer, RAM manufacturer, etc.). Other types of data may be accessed as determined by the diagnostic data engine 100, such as the type of resource running on a device, type of hardware, physical location, installed software, what customers are associated with the device, and so on.

As indicated above, an API or a programming interface sub-system may be provided for facilitating the submission of diagnostic information requests. The API may be configured to receive electronic messages that encode identifiers indicative of a diagnostic information request for fulfillment by the diagnostic data engine 100. In response to receiving one of the electronic messages, the API may send second electronic messages indicative of information indicating that a diagnostic information request has been received, and provide the results of the diagnostic information collection.

Figure 3:
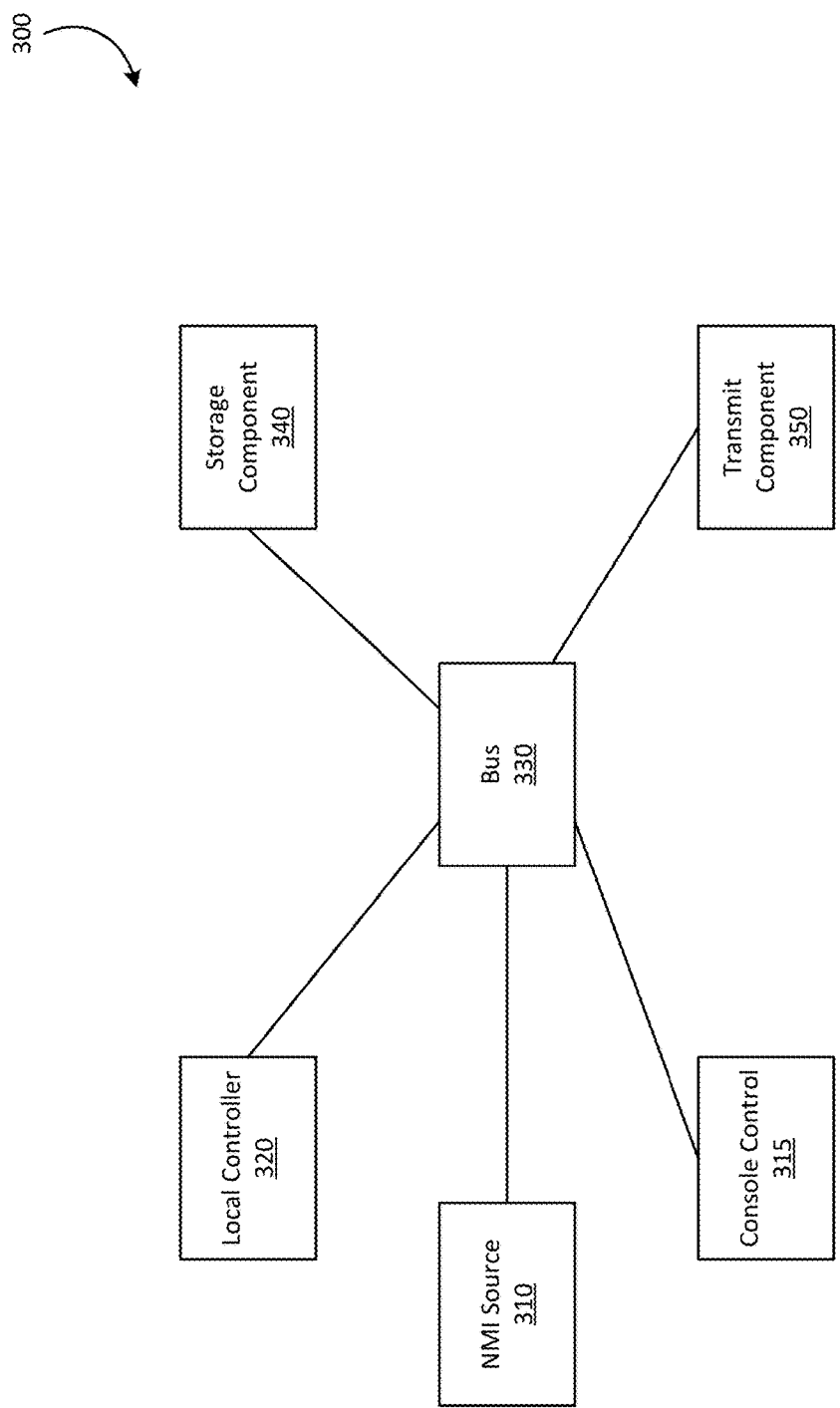
FIG. 3 is a diagram illustrating an example system for managing operability of a provider network in accordance with the present disclosure.

FIG. 3 provides an example a system 300 for managing operability of a provider network, where the network comprises a plurality of computing resources. Although FIG. 3 depicts individual logical components of the system 300, the system 300 may be implemented using, for example, one or more computing nodes and one or more memories bearing instructions that, upon execution by the one or more computing nodes, cause the system to perform various functions. In other embodiments, the components of system 300 are implemented within a particular computing device using a combination of hardware and software. Some of the described components may be implemented by diagnostics data engine 100 depicted in FIG. 1. The components are communicatively coupled by a network or by a bus 330.

A local controller 320 of a computing resource may receive an NMI from an NMI source 310 (e.g., an NMI button) or a request from a user control or a console control interface 315. The request may be for diagnostic information for one of the computing resources. The local controller 320 may read local data in response to the NMI and/or the request received by the controller 320. The local data may be stored in a local storage 340. In some cases, the request may be generated in response to an indication of a fault event at the computing resource. The controller 320 may access, for example, diagnostic information for the computing resource via an out-of-band communication channel, as explained in more detail below. The out-of-band communication channel may be an interface that is operative even when the computing resource is not in a normal operating state (e.g., the computing resource has crashed).

A transmit component 350 may send some or all of the stored data to a requesting system. The transmit component 350 may send the stored data to data diagnostics engine 100 for analysis and troubleshooting. The transmit component 350 may also access previously stored diagnostic information and send the previously stored data to data diagnostics engine 100. The previously stored diagnostics information may include, for example, diagnostic information that was periodically reported by the computing resource. The previously stored diagnostics information may be stored in storage component 340, or another storage device such as data store 150 depicted in FIG. 1. The components of FIG. 3 may be modified or combined. For example, in some embodiments the storage component 340 and the transmit component 350 may be combined.

Figure 4:
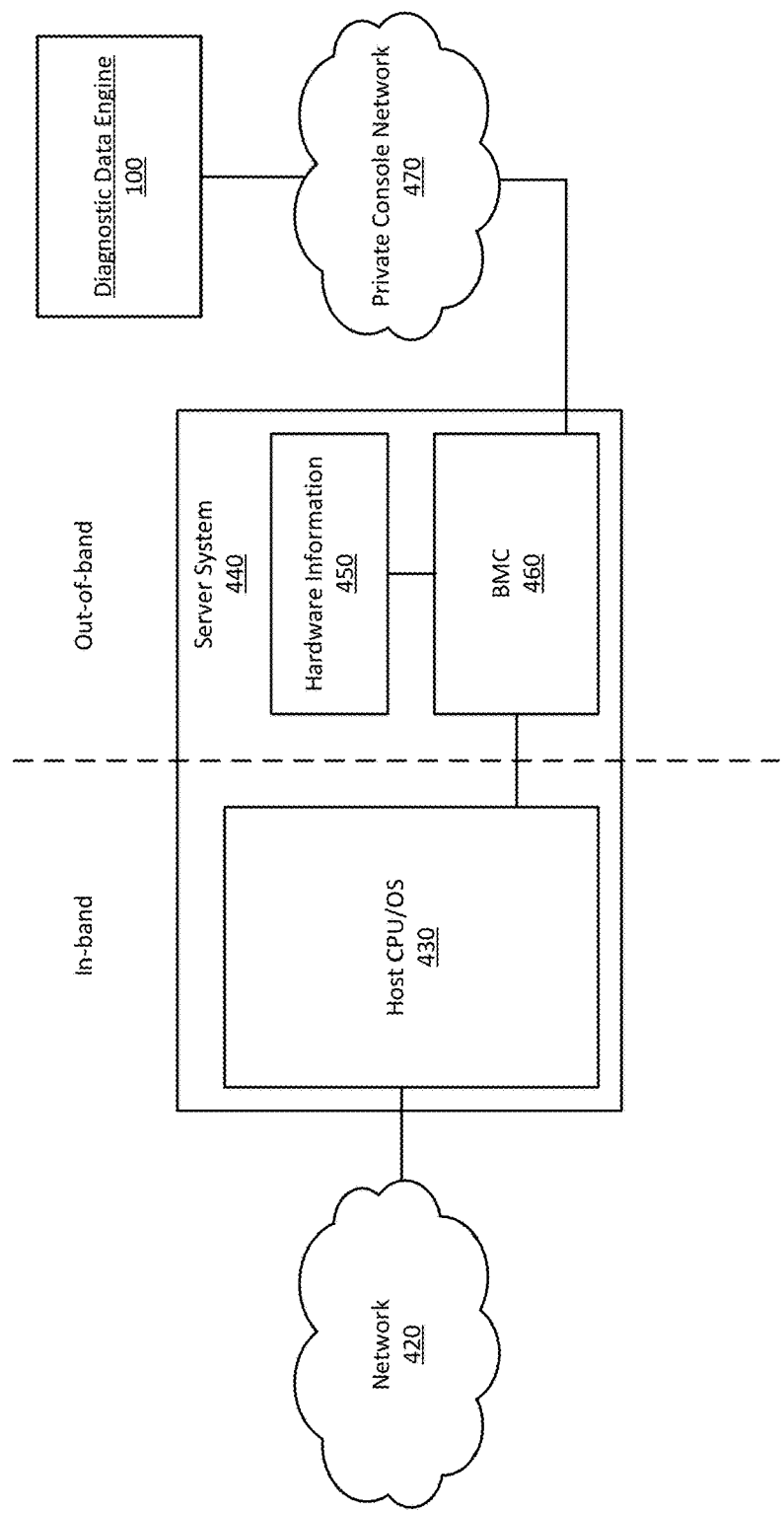
FIG. 4 is a diagram illustrating an example system for managing operability of a provider network in accordance with the present disclosure.

FIG. 4 is a diagram illustrating an example of the use of out-of-band communications for managing operability of a provider network in accordance with the present disclosure. Referring to FIG. 4, illustrated is a server system 440 that may be provided as a computing resource in a data center and that may provide various resources and applications for customers of the data center. It will be appreciated that some embodiments may involve additional server systems and networks.

FIG. 4 illustrates that server system 440 has various hardware information 450 that may include hardware diagnostic information such as PCI configuration data, chipset register data, BMC management data, processor register data, and the like. FIG. 4 also illustrates that server system 440 includes a baseboard management controller (BMC) 460 that may be implemented as a programmed processor or microcontroller installed on the motherboard of server system 440. The BMC 460 may be programmed to control host CPU/OS 430 of server system 440, various hardware systems and hardware information sources of server system 440, and private console network 470. The private console network 470 may be a network that may be used to communicate out-of-band data and can be used to monitor device status and send/receive diagnostic information. The diagnostic information may be accessed by system administrators via a console for requesting the diagnostic information and viewing the diagnostic information. Various hardware systems and devices of server system 440 may report diagnostic information to BMC 460. The BMC 460 provides the hardware information 450 as part of the out-of-band communications that can operate without normal operation of host CPU/OS 430. FIG. 4 illustrates that server system 440 may provide resources and applications via the in-band operations during normal operation of host CPU/OS 430. Server system 440 may communicate with other systems during in-band operations via network 420, which is separate from the private console network 470.

BMC 460 may be configured to send the hardware information 450 to other systems via private console network 470 in response to a request for the information or a predetermined fault condition. Data center administrators may also communicate with BMC 460 via private console network 470 to send information requests or to cause some action by the server system 440 such as resetting power. Data center administrators may communicate with BMC 460, for example, via diagnostic data engine 100 that communicates on the private console network 470.

Figure 5:
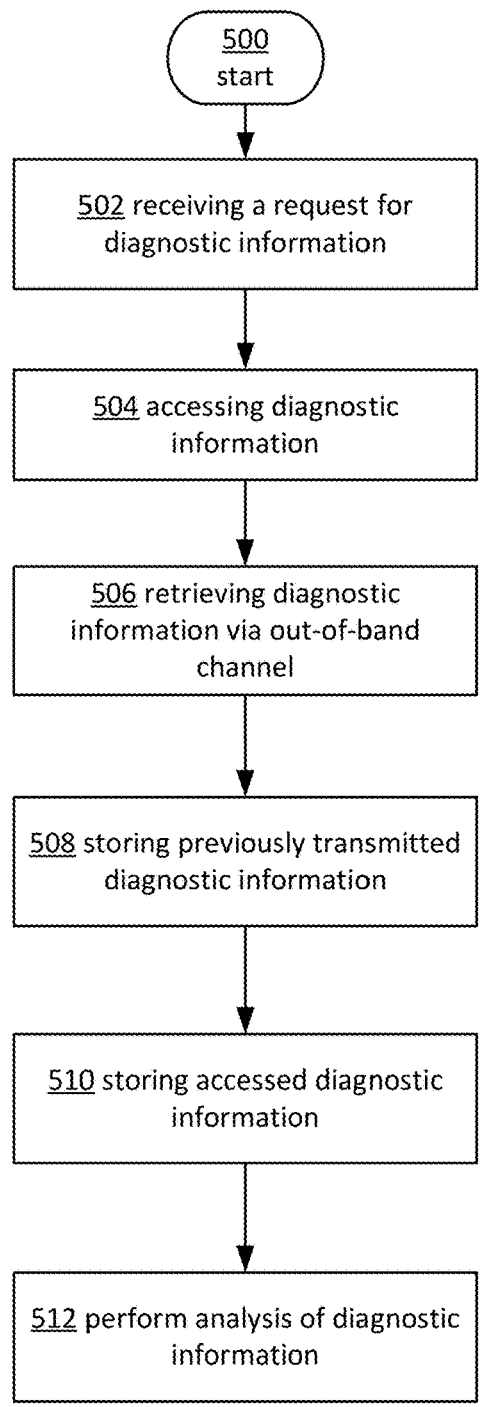
FIG. 5 is a flowchart depicting an example procedure for managing operability of a provider network in accordance with the present disclosure.

FIG. 5 illustrates an example operational procedure for managing a provider network. The provider network may comprise a plurality of servers. In an embodiment, a mechanism for providing resource status can be provided by services such as diagnostic data engine 100 in FIG. 1. The operational procedure may be implemented in a system comprising one or more computing devices. In one embodiment, the system may comprise a computing services platform such as a multi-tenant web services platform. Referring to FIG. 5, operation 500 begins the operational procedure. Operation 500 may be followed by operation 502. Operation 502 illustrates receiving a request for diagnostic information for one of the servers. Operation 502 may be followed by operation 504. Operation 504 illustrates accessing diagnostic information for one of the servers. In an embodiment, the accessing of the diagnostic information may be performed in response to receiving a request for the diagnostic information for one of the plurality of servers. The request may be generated in response to a user control. In some embodiments, the request may be generated in response to an indication of a fault event at the server. The request for diagnostic information may be generated as an NMI event, for example. The request for diagnostic information may also be generated in response to a predetermined fault event. The predetermined fault event may be, for example, a failure that prevents a server of the provider network from entering system management mode (SMM).

The diagnostic information may comprise PCI configuration data, chipset register data, BMC management data, processor register data, and the like.

Operation 504 may be followed by operation 506. Operation 506 illustrates retrieving the diagnostic information from the one server via an out-of-band communication channel when the one server is not in a normal operating state. In some embodiments, the out-of-band communication channel may be operative when the one server is not in a normal operating state.

Operation 506 may be followed by operation 508. Operation 508 illustrates storing previously transmitted diagnostic information for the one server for fault analysis. Operation 508 may be followed by operation 510. Operation 510 illustrates storing the accessed diagnostic information for fault analysis. In one embodiment, previously transmitted diagnostic information for the plurality of server of the provider network may also be stored for fault analysis. Operation 510 may be followed by operation 512. Operation 512 illustrates performing analysis of previously transmitted diagnostic information and the accessed diagnostic information.

In an embodiment, a predicted fault event may be determined based on the previously transmitted diagnostic information and the accessed diagnostic information. Additionally, a likely or probable cause for the predicted fault event may be determined.

In some implementations, an API may be instantiated. The API may be configured to receive first electronic messages that encode identifiers indicative of a request for diagnostic information. In response to receiving one of the first electronic messages, the API may be configured to send second electronic messages indicative of information pertaining to the request.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity such as a company or organization to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 6:
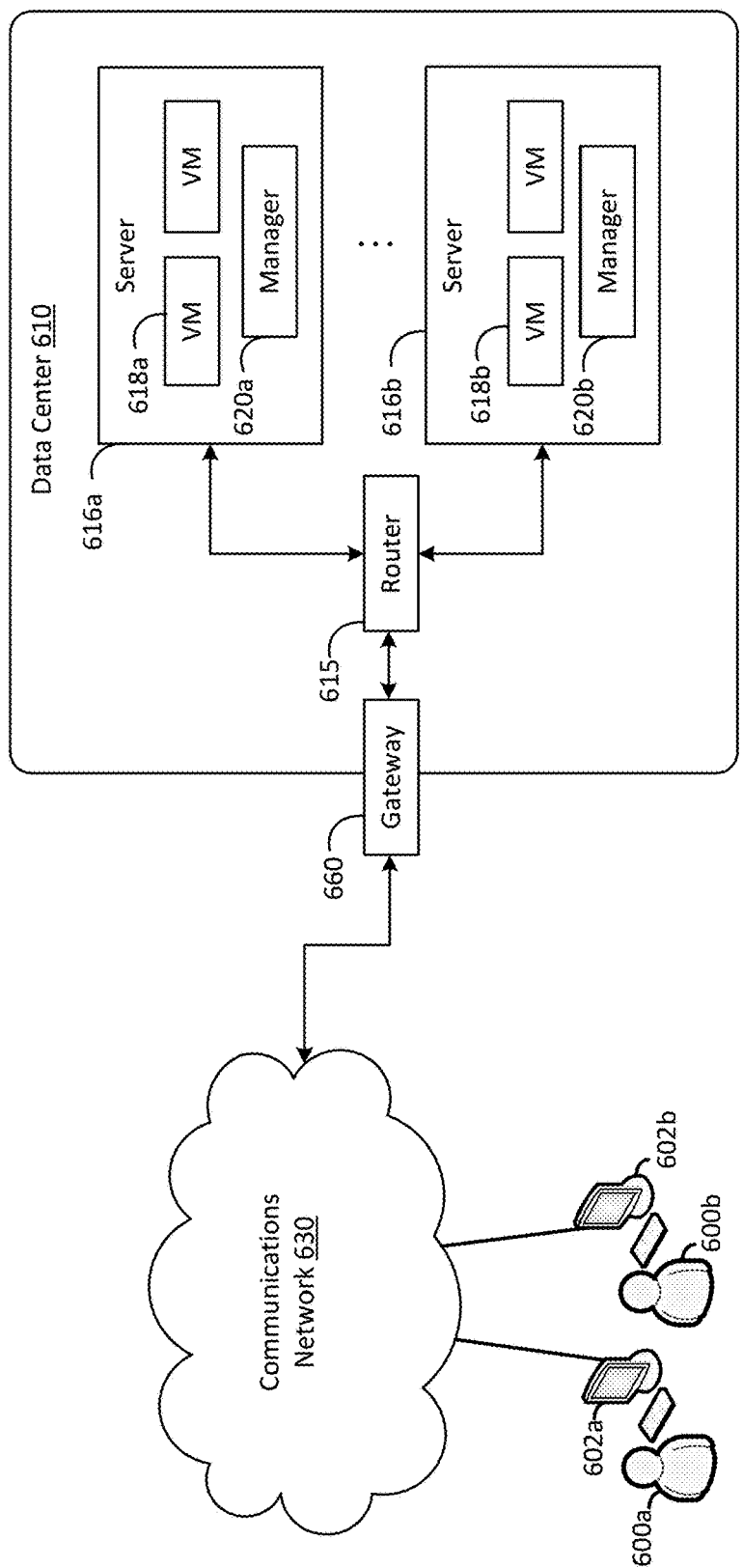
FIG. 6 is a diagram illustrating an example computing system that may be used in some embodiments.

FIG. 6 illustrates an example computing environment in which the embodiments described herein may be implemented. FIG. 6 is a diagram schematically illustrating an example of a data center 610 that can provide computing resources to users 600a and 600b (which may be referred herein singularly as "a user 600" or in the plural as "the users 600") via user computers 602a and 602b (which may be referred herein singularly as "a computer 602" or in the plural as "the computers 602") via a communications network 630. Data center 610 may be configured to provide computing resources for executing applications on a permanent or an as-needed basis. The computing resources provided by data center 610 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Data center 610 may include servers 616a and 616b (which may be referred herein singularly as "a server 616" or in the plural as "the servers 616") that provide computing resources available as virtual machine instances 618a and 618b (which may be referred herein singularly as "a virtual machine instance 618" or in the plural as "the virtual machine instances 618"). The virtual machine instances 618 may be configured to execute applications, including web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, for example, a corporate or university network that is wholly or partially inaccessible to non-privileged users. In still other embodiments, communications network 630 may include one or more private networks with access to and/or from the Internet.

Communications network 630 may provide access to computers 602. Computers 602 may be computers utilized by customers 600 or other customers of data center 610. For instance, user computer 602a or 602b may be a server, a desktop or laptop personal computer, a tablet computer, a wireless telephone, a personal digital assistant (PDA), an e-book reader, a game console, a set-top box, or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

Computers 602 may also be utilized to configure aspects of the computing resources provided by data center 610. In this regard, data center 610 might provide a web interface through which aspects of its operation may be configured through the use of a web browser application program executing on user computer 602. Alternatively, a stand-alone application program executing on user computer 602 might access an application programming interface (API) exposed by data center 610 for performing the configuration operations. Other mechanisms for configuring the operation of the data center 610, including deploying updates to an application, might also be utilized.

Servers 616a and 616b shown in FIG. 6 may be standard servers configured appropriately for providing the computing resources described above and may provide computing resources for executing one or more applications. In one embodiment, the computing resources may be virtual machine instances 618. In the example of virtual machine instances, each of the servers 616 may be configured to execute an instance manager 620a or 620b (which may be referred herein singularly as "an instance manager 620" or in the plural as "the instance managers 620") capable of executing the virtual machine instances. The instance managers 620 may be a virtual machine monitor (VMM) or another type of program configured to enable the execution of virtual machine instances 618 on servers 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 615 may be utilized to interconnect the servers 616a and 616b. Router 615 may also be connected to gateway 660, which is connected to communications network 630. Router 615 may manage communications within networks in data center 610, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
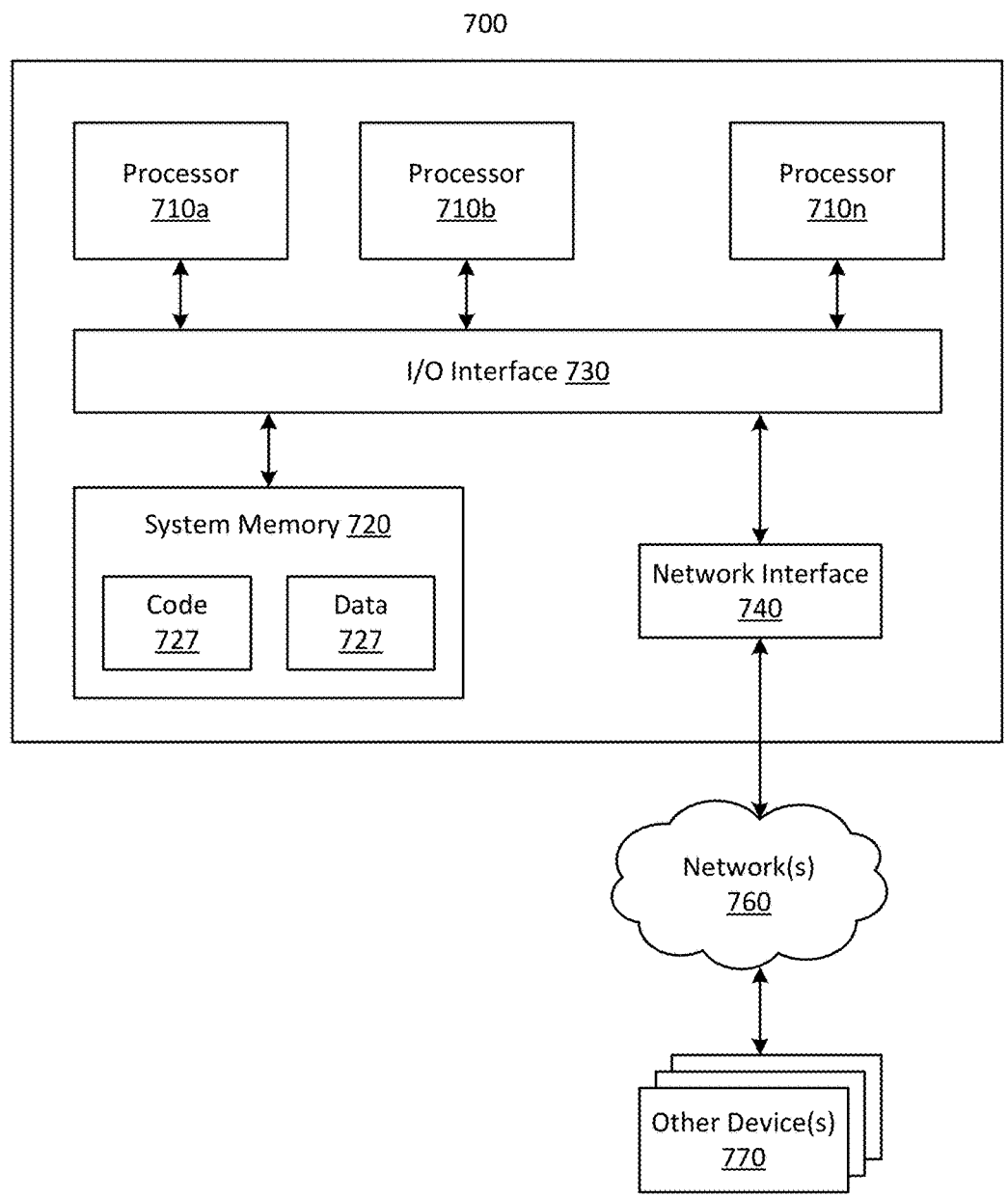
FIG. 7 is a diagram illustrating an example computing system that may be used in some embodiments.

In at least some embodiments, a server that implements a portion or all of one or more of the technologies described herein, including the techniques to implement the functionality of a diagnostic data engine 100 may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 1000 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x87, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 727 and data 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 760, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for managing a provider network, the network comprising a plurality of servers, the system comprising:
   one or more computing nodes; and
   a memory bearing instructions that, upon execution by the one or more computing nodes, cause the system at least to:
      receive a first electronic message that encodes an identifier indicative of a request for diagnostic information for one of the servers; and
      in response to receiving the electronic message:
         access previously transmitted diagnostic information for the one server;
         retrieve at least a subset of the requested diagnostic information from the one server via an out-of-band communication channel, wherein the out-of-band communication channel is operative when the one server is not in a normal operating state;
         send a second electronic message indicative of information pertaining to the request; and
         store the previously transmitted diagnostic information and the accessed diagnostic information for fault analysis.

2. The system of claim 1, wherein the request is generated in response to a user control.

3. The system of claim 1, wherein the request is generated in response to an indication of a fault event at the one of the servers.

4. The system of claim 1, wherein the instructions further cause the system to store previously transmitted diagnostic information for the plurality of servers of the provider network.

5. A method comprising:
receiving, via an application programming interface, a request for diagnostic information for one of a plurality of computing resources in a network, wherein the request comprises a message that encodes an identifier indicative of the requested diagnostic information;
in response to receiving the request, accessing at least a subset of the diagnostic information from the one computing resource;
when the one computing resource is not in a normal operating state, further accessing the diagnostic information from the one computing resource via an out-of-band communication channel;
storing previously transmitted diagnostic information for the one computing resource and the accessed diagnostic information for fault analysis; and
sending, via the application programming interface and based on the request, data indicative of information pertaining to the request.

6. The method of claim 5, wherein the out-of-band communication channel is coupled to a baseboard management controller (BMC).

7. The method of claim 5, wherein the request is generated in response to a user control.

8. The method of claim 5, wherein the request is generated in response to an indication of a fault event at the one computing resource.

9. The method of claim 5, further comprising storing previously transmitted diagnostic information for the plurality of resources of the network.

10. The method of claim 5, wherein the diagnostic information comprises PCI configuration data, chipset register data, BMC management data, processor register data, or a combination thereof.

11. The method of claim 5, further comprising analyzing the previously transmitted diagnostic information and the accessed diagnostic information.

12. The method of claim 11, further comprising determining a predicted fault event based on the previously transmitted diagnostic information and the accessed diagnostic information.

13. The method of claim 12, further comprising determining a likely cause for the predicted fault event.

14. The method of claim 5, wherein the request for diagnostic information is generated as a non-maskable interrupt (NMI) event.

15. The method of claim 5, wherein the request for diagnostic information is generated in response to a predetermined fault event.

16. The method of claim 15, wherein the predetermined fault event is a failure that prevents a computing resource of the network from entering system management mode (SMM).

17. A non-transitory computer-readable storage medium having stored thereon computer-readable instructions that, upon execution on a computing device, at least cause the computing device to:
receive, by an application programming interface, a request for diagnostic information for one of a plurality of computing resources of a provider network, the request comprising a message that encodes an identifier indicative of the requested diagnostic information;
in response to receiving the request, access a subset of the requested diagnostic information from the one computing resource, wherein the requested subset of the diagnostic information is accessed from the one computing resource via an out-of-band communication channel that is operative when the one computing resource is in an abnormal operating state; and
provide, by the application programming interface and based on the request, diagnostic information comprising the subset.

18. The computer-readable storage medium of claim 17, wherein the request is generated in response to a user control.

19. The computer-readable storage medium of claim 17, wherein the request is generated in response to an indication of a fault event at the one computing resource.

20. The computer-readable storage medium of claim 19, wherein the fault event is a failure that prevents a computing resource of the provider network from entering system management mode (SMM).

* * * * *